(12) United States Patent
Tulloch et al.

(10) Patent No.: US 8,586,696 B2
(45) Date of Patent: Nov. 19, 2013

(54) ZIRCONIUM COMPOUND, CATALYST AND ITS USE FOR POLYURETHANE MANUFACTURE

(75) Inventors: Arran Alexander Dickon Tulloch, North Yorkshire (GB); Swagata Nanda, Cleveland (GB); Bruno Frederic Stengel, Brussels (BE)

(73) Assignee: Dorf Ketal Chemicals (India) PVT. Ltd, Mumbai (IN)

( * ) Notice: Subject to any disclaimer, the term of this patent is extended or adjusted under 35 U.S.C. 154(b) by 963 days.

(21) Appl. No.: 11/994,704

(22) PCT Filed: Jul. 4, 2006

(86) PCT No.: PCT/GB2006/050187
§ 371 (c)(1),
(2), (4) Date: Jul. 30, 2008

(87) PCT Pub. No.: WO2007/003966
PCT Pub. Date: Jan. 11, 2007

(65) Prior Publication Data
US 2008/0312402 A1    Dec. 18, 2008

(30) Foreign Application Priority Data
Jul. 4, 2005  (GB) .................................. 0513616.3

(51) Int. Cl.
*C08G 18/10*    (2006.01)
(52) U.S. Cl.
USPC .................................. 528/56; 528/48; 528/55
(58) Field of Classification Search
USPC ........... 528/48, 55, 56; 502/308, 349; 556/51, 556/52, 55, 56; 252/182.21, 182.22
See application file for complete search history.

(56) References Cited

U.S. PATENT DOCUMENTS 5,846,897 A    12/1998    Blank et al.
5,902,835 A  *  5/1999    Meier et al. .................... 521/125

FOREIGN PATENT DOCUMENTS

| EP | 0 516 361 A1 | 12/1992 | |
|---|---|---|---|
| GB | 1 444 933 | 8/1976 | |
| WO | WO-93/03082 A1 | 2/1993 | |
| WO | WO-2004/044027 A1 | 5/2004 | |
| WO | WO-2005/058996 A1 | 6/2005 | |
| WO | WO 2005058996 A1 * | 6/2005 | ............. C08G 18/22 |

OTHER PUBLICATIONS

Patil et al., Synthesis and structure of mixed isopropoxide-β-ketoester and β-ketoamide zirconium complexes: Potential precursors for MOCVD of $ZrO_2$. J. Mater. Chem, 2003.

* cited by examiner

*Primary Examiner* — Michael L Leonard
(74) *Attorney, Agent, or Firm* — Conley Rose, P.C.; Rodney B. Carroll

(57) ABSTRACT

The invention comprises a catalyst compound of formula $Zr(L)(A^1)(A^2)(A^3)$ where L represents a ketoamide ligand, $A^1, A^2$ & $A^3$ may be the same or different and each represent a ligand derived from a compound selected from the group consisting of:—an alcohol, a polyol, an alkyl acetoacetate, a diketone, a ketoamide, a carboxylic acid or ester thereof, an alkanolamine, a phosphoric acid ester and a sulphonic acid or ester thereof. The compound may be made by the reaction of a zirconium alkoxide or haloalkoxide with a ketoamide. The compound is useful as a catalyst for the reaction of a polyisocyanate with a hydroxyl-containing compound, e.g. for the manufacture of polyurethanes or composite cellulosic materials such as fibre-boards.

34 Claims, No Drawings

ZIRCONIUM COMPOUND, CATALYST AND ITS USE FOR POLYURETHANE MANUFACTURE

CROSS-REFERENCE TO RELATED APPLICATIONS

This application is the U.S. National Phase application of PCT International Application No. PCT/GB2006/050187, filed Jul. 4, 2006, and claims priority of British Patent Application No. 0513616.3, filed Jul. 4, 2005, the entirety of which is incorporated herein by reference.

FIELD OF THE INVENTION

The present invention concerns a novel catalyst comprising a zirconium chelate, and its use to catalyse the reaction of an isocyanate-containing compound with an alcohol or an amine to form a polyurethane or a polyurea.

BACKGROUND OF THE INVENTION

Polyurethanes are typically made by reacting a polyisocyanate compound with a polyol in the presence of an organometallic catalyst. Catalysts for polyurethane manufacture are conventionally based on tin compounds such as dibutyl tin dilaurate or compositions of mercury such as phenyl mercuric neodecanoate. More recently, compounds based upon metals such as titanium or nickel have been used.

Compounds of titanium, zirconium, hafnium, iron (III), cobalt (III) or aluminium were described in WO2004/044027. Such compounds are of general formula RO-M(L$^1$)$_x$(L$^2$)$_y$(L$^3$)$_z$ where R is alkyl or a hydroxy-alkyl, hydroxyalkoxyalkyl, or (hydroxy)polyoxyalkyl group and up to 2 of L$^1$ to L$^3$ may represent an amide of acetoacetic acid. These compounds have a single labile —OR ligand and were believed to function as a cure catalyst by exchange or insertion of the polyol or of the isocyanate at the labile site on the organometallic composition, by displacement of the OR group.

U.S. Pat. No. 5,846,897 discloses zirconium compounds with diketones or alkylacetoacetates which catalyse the isocyanate—alcohol reaction having the chemical structure: Me (X1, X2, X3, X4) wherein Me is zirconium (Zr) or hafnium (Hf) and X1, X2, X3, and X4, are the same or different and selected from the group consisting of a diketone and an alkylacetoacetate having the structures: R$_1$COCH$_2$COR$_2$ and R$_1$OCOCH$_2$COR$_2$ wherein each of R$_1$ and R$_2$ is a branched or linear C1-C20 hydrocarbon and at least one of X1, X2, X3, and X4 is a diketone with structure (II) wherein the total number of carbons in R$_1$+R$_2$ is at least 4. Patil et al (J. Mater Chem 2003, 13, 2177-2184) have used zirconium bis(isopropoxide)bis(N,N-diethylacetoacetamide) as a precursor for the metal-organic chemical vapour deposition of zirconium dioxide.

It is an object of the invention to provide an alternative catalyst for making polyurethanes.

SUMMARY OF THE INVENTION

The catalyst is of formula Zr(L)(A$^1$)(A$^2$)(A$^3$) where L represents a ketoamide ligand, A$^1$, A$^2$ & A$^3$ may be the same or different and each represent a ligand derived from a compound selected from the group consisting of:— an alcohol, a polyol, an alkyl acetoacetate, a diketone, a ketoamide, a carboxylic acid or ester thereof, an alkanolamine, a phosphoric acid ester and a sulphonic acid or ester thereof; provided that either:
(i) none of A$^1$, A$^2$ & A$^3$ represent a ligand —OR where R is alkyl or a hydroxy-alkyl, hydroxyalkoxyalkyl, or (hydroxy)polyoxyalkyl group, or
(ii) at least two of A$^1$, A$^2$ & A$^3$ represent a ligand —OR where R is alkyl or a hydroxy-alkyl, hydroxyalkoxyalkyl, or (hydroxy)polyoxyalkyl group.

DETAILED DESCRIPTION OF THE INVENTION

In this specification, we refer to "a ligand derived from" a compound in the sense that the ligand has been formed by the reaction of the compound with a zirconium compound to form the claimed catalyst or a precursor thereto. Thus, for example, a ligand derived from an alcohol ROH is present in the catalyst as an alkoxide RO—, and a ligand derived from a carboxylic acid RCOOH is present in the catalyst as a carboxylate RCOO—. The skilled person will therefore understand that the compounds referred to as forming a ligand L or A will be present in the catalyst in their reacted form and generally not in the unreacted form of the compound. Most of the ligand-forming compounds herein react with a zirconium compound though a reactive —OH to form an —O—Zr— linkage in the catalyst.

The ketoamide ligand, L, is derived from a ketoamide of general structure shown in Formula 1, which is believed to react with the zirconium alkoxide or haloalkoxide through its "enol" form, shown in Formula 1', to form a ligand R$^1$R$^2$NCOCR$^3$CR$^4$O—.

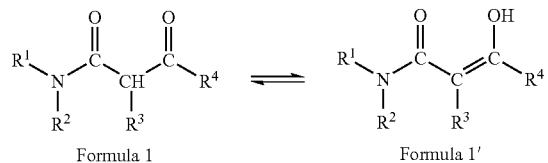

Formula 1        Formula 1'

In Formula 1 & 1', R$^1$, R$^2$ and R$^4$ are independently selected from H, linear or branched alkyl or aryl. When R$^1$, R$^2$ and/or R$^4$ are alkyl groups, they preferably contain from 1 to 22 carbon atoms, more preferably from 1 to 8 C atoms. When R$^1$, R$^2$ and/or R$^4$ are aryl groups, they may be unsubstituted or substituted with alkyl, halogen or ether groups. By "aryl" we include polycyclic aromatic groups. It is preferred that R$^1$, R$^2$ and/or R$^4$ are not H, and tertiary amides, i.e. where neither R$^1$ nor R$^2$ is H are preferred. R$^3$ is selected from H or linear or branched alkyl, preferably containing from 1 to 22 carbon atoms, more preferably from 1 to 8 C atoms.

L is preferably a ligand derived from a N,N-dialkyl acetoacetamide (DAAA) and a preferred dialkyl acetoacetamide comprises N,N-diethylacetoacetamide (DEAA). Other suitable ketoamides include acetoacetanilide, o-acetoacetaniside, 2'-benzoylacetanilide, 4'-chloroacetoacetanilide, p-acetoacetaniside, N,N-dimethylacetoacetamide, N-methylacetoacetamide, N-ethylacetoacetamide, N-(2-acetamidophenethyl)-1-hydroxy-2-naphthamide, 2',5'-dichloroacetoacetanilide, 2',4'-dimethylacetoacetanilide and 2-methylacetoacetanilide.

The reaction product may contain more than 1 mole of ketoamide per mole of zirconium when at least one of A$^1$, A$^2$ & A$^3$ is derived from a ketoamide. The product may contain up to four moles of ketoamide bound to the zirconium atom to form a chelate. Each ketoamide ligand may be the same as or different from each other ketoamide ligand. In a preferred composition containing 2 or 4 ketoamide ligands, each ketoamide ligand is derived from the same ketoamide compound. The product may also contain a free ketoamide compound, i.e. there may be more than 4 moles of ketoamide per mole of zirconium. In one embodiment, the catalyst is a composition comprising from 1 to 10 moles, more preferably from 2 to 4 moles, of free ketoamide per mole of zirconium. One preferred such embodiment comprises a composition of formula [Zr(DEAA)$_4$+2DEAA]. For convenience, when we refer to Zr(DEAA)x, this means that the zirconium compound has x ligands derived from DEAA, which is present in the catalyst in its reacted form.

$A^1$, $A^2$ & $A^3$ may be the same or different and each represent a ligand derived from a compound selected from the group consisting of an alcohol, a polyol, an alkyl acetoacetate, a diketone, a ketoamide, a carboxylic acid or ester thereof, an alkanolamine or a phosphoric acid ester. The alcohol is of general formula R—OH where R is an alkyl or aryl (including polyaryl) group. Where R is aryl, we include phenol, napthol and substituted versions of these, e.g. alkylphenols such as dodecylphenol. Preferably R is alkyl, more preferably an alkyl group containing from 1 to 12° C. atoms, and most preferably an alkyl group containing from 2 to 8 C atoms. When more than one of $A^1$, $A^2$ & $A^3$ is derived from an alcohol then each R may or may not be the same as the other(s). Preferred alcohols include, ethanol, isopropanol, n-propanol, tertiary butanol, n-butanol, 2-ethylhexanol, amyl alcohol, tert-amyl alcohol, hexanol, cyclohexanol, phenol, dodecylphenol and naphthol. The alcohol reacts with a zirconium compound to form an alkoxide or aryloxide RO— ligand. When only one of $A^1$, $A^2$ & $A^3$ is derived from an alcohol, then the alcohol is not a singly-functionalised alkyl alcohol, R—OH where R is alkyl. When more than one of $A^1$, $A^2$ & $A^3$ is derived from an alcohol, then either none of them is a singly-functionalised alkyl alcohol, R—OH where R is alkyl or alternatively at least two of them is a singly-functionalised alkyl alcohol, R—OH where R is alkyl. Compounds disclosed in WO-A-2004/044027 are thereby excluded from the scope of this invention. The compounds disclosed in WO-A-2004/044027 all have a single labile alkoxy ligand which provides an active site for catalysis. In one preferred embodiment of the invention, the catalyst has the general formula Zr(ketoamide)$_2$(OR)$_2$ where R is alkyl, more preferably an alkyl group containing from 1 to 12 C atoms, and most preferably an alkyl group containing from 2 to 8 C atoms. As examples of such compounds, we include Zr(DEAA)$_2$(2-ethylhexoxide)$_2$, Zr(n-butoxide)$_2$(DEM)$_2$, Zr(n-propoxide)$_2$(DEAA)$_2$, Zr(DEM)$_2$(tert-amylalkoxide)$_2$ and Zr(isopropoxide)$_2$(DEAA)$_2$.

The polyol may be a monomeric alcohol having more than one hydroxy group, for example ethylene glycol, 1,3-propylene glycol, 1,4-butane diol, or a dimeric or polymeric alcohol such as diethylene glycol, dipropylene glycol, polyethylene glycol, polypropylene glycol. The polyol also includes polyester polyols and polyether polyols of the type typically used in the manufacture of polyurethanes and which are commercially available. Hydroxy-functionalised resins may also be suitable for forming one or more of the A ligands in general formula 1. Such resins include hydroxyl-containing resins which are sold for use in printing inks, preferably having a hydroxyl number of from about 100 to about 500, especially from about 200 to about 400 mg KOH/g (tested according to DIN 53 240). Examples of suitable synthetic resins include ketone-aldehyde resins especially ketone-formaldehyde resins such as hydrogenated acetophenone formaldehyde condensation resins, cyclohexanone-formaldehyde condensation resins and urethane-modified ketone aldehyde resins. Such resins are available from Degussa AG as Synthetic Resins 1201, CA and SK, for example.

When a polyol is used it is likely to bond to the zirconium as a multidentate ligand so that more than one of $A^1$, $A^2$ & $A^3$ may be represented by the same molecule, i.e. $A^1$, $A^2$ and/or $A^3$ may be linked together. When such a multidentate ligand is used, each molecule may bond multiply to the same zirconium atom or alternatively it may bond to more than one zirconium atom to form a bridge between the zirconium atoms. It is likely that in such compounds there is a mixture containing bridged and non-bridged structures. In a preferred embodiment of the catalyst involving such a multidentate ligand, the catalyst is of general formula Zr(ketoamide)$_2$(polyol) and/or Zr$_2$(ketoamide)$_4$(polyol)$_2$ and/or higher oligomeric bridged structures where (polyol) is in each case a ligand derived from the polyol by reaction of two hydroxy functions with zirconium to form two alkoxide bonds. References to any Zr(L) (A)(polyol) compound therefore refer to the empirical formula and include compounds in which bridged dimeric and oligomeric forms are present. Preferred examples of this type include Zr(DEAA)$_2$(1,3-propanedioxide), Zr(DEM)$_2$(1,4-butanedioxide) and Zr(DEAA)$_2$(diethyleneglycoxide).

$A^1$, $A^2$ and/or $A^3$ may each represent a ligand derived from an alkyl acetoacetate, i.e. an ester of an alkyl alcohol $R^5$OH with acetoacetic acid wherein $R^5$ is a branched or linear C1-C20 hydrocarbon; more preferably $R^5$ contains from 1 to 8 carbon atoms. Ethylacetoacetate (EAA) is a particularly preferred alkyl acetoacetate compound. When we refer to Zr(EAA)$_n$, we mean a zirconium compound having n ligands derived from ethylacetoacetate.

$A^1$, $A^2$ and/or $A^3$ may each represent a ligand derived from a diketone which is preferably a s-diketone of general formula $R^6$COCH$_2$COR$^7$ wherein each of $R^6$ and $R^7$ is a branched or linear C1-C20 hydrocarbon. Preferred diketones include acetylacetone (2,4-pentanedione), 2,4-heptanedione and alkyl-substituted versions thereof and 3,5-heptanedione and alkyl-substituted versions thereof.

$A^1$, $A^2$ and/or $A^3$ may each represent a ligand derived from a carboxylic acid or ester thereof. Suitable carboxylic acids include benzoic acid and alkyl carboxylic acids, for example a $C_2$-$C_{30}$ carboxylic acid, especially a $C_4$-$C_{22}$ carboxylic acid such as butyric, neodecanoic, stearic, isostearic, oleic or 2-ethyl-hexylcarboxylic acid. The carboxylic acid or ester may contain more than one carboxylic acid group such as malonic acid, tartaric acid and their esters, especially alkyl esters e.g. diethyl malonate. Hydroxycarboxylic acids such as lactic acid, citric acid, oxalic acid may also form suitable ligands with zirconium.

$A^1$, $A^2$ and/or $A^3$ may each represent a ligand derived from an alkanolamine, i.e. a compound of general formula HO(CH$_2$)$_x$NR$^8$$_2$ where $R^8$ comprises HO(CH$_2$)$_x$ or an alkyl group or hydrogen. X is an integer and preferably ranges from 1 to 8. Preferred alkanolamines include ethanolamine, diethanolamine and triethanolamine although others are suitable.

$A^1$, $A^2$ and/or $A^3$ may each represent a ligand derived from an organophosphorus compound having a P—OH group, particularly a phosphate ester, i.e. an alkyl or aryl acid phosphate, or a salt thereof comprising a dialkyl phosphate, a diaryl phosphate, a monoalkyl phosphate, a monoaryl phosphate or a mixture of two or more of a dialkyl phosphate, a diaryl phosphate, a monoalkyl phosphate and a mono aryl phosphate, a phosphonate ester or a salt thereof comprising an alkyl or aryl phosphonate or salts thereof, an alkyl or aryl pyrophosphate, an alkyl or aryl phosphonic acid or alkyl or aryl ester thereof or a salt thereof, a dialkyl or aryl phosphinic acid or salt thereof. In all cases the organophosphorus compound contains a P—OH group, i.e. an acidic group or its salt, i.e. a P—O⁻M⁺ group where M is metal or ammonium. Preferred organophosphorus compounds comprise an alkyl phosphate compound which may be a mono- or a di-alkyl phosphate or is conveniently a mixture of mono- and dialkyl phosphates, such mixtures being more readily available than pure mono- or a di-alkyl phosphates. Monoalkyl phosphates generally have a formula $(R^9O)PO(OH)_2$. Dialkyl phosphates generally have the formula $(R^9O)(R^{10}O)PO(OH)$. $R^9$, $R^{10}$ may be the same or different and represent a linear or branched alkyl group usually containing up to 8 carbon atoms and preferably containing up to 5 carbon atoms. Usually, but not necessarily, $R^9$, and $R^{10}$ are identical. Preferably $R^9$, and $R^{10}$ are selected from n-butyl, sec-butyl, tert-butyl, iso-propyl, n-propyl, ethyl, methyl, phenyl, amyl and ethyl-hexyl.

Suitable phosphonate ester, phosphonic acid, phosphinic acid or salt thereof comprises an alkyl or aryl phosphonate, phosphonic acid or their salts and generally have a formula $(R^{11})_n PO(OR^{12})_{2-n}(OH)$, where $R^{11}$ and $R^{12}$ each represent a hydrogen atom or an aryl group or an alkyl group containing up to 8 carbon atoms and preferably containing up to 5 carbon atoms and n is 1 or 2.

$A^1$, $A^2$ and/or $A^3$ may each represent a ligand derived from a sulphonic acid or ester thereof, i.e. a compound of general formula $R^{13}SO_3H$ or its ester where R is aryl or alkyl. Examples of suitable sulphonic acids include methane sulphonic acid and substituted benzene sulphonic acids such as dodecylbenzene sulphonic acid. Salts of these sulphonic acids are also suitable, for example alkali metal salts such as the sodium salt and quaternary ammonium salts.

The catalyst of the invention preferably comprises the reaction product of a zirconium alkoxide or haloalkoxide with a ketoamide compound and optionally with at least one other ligand-forming compound. The compounds of the invention may be made by reacting a zirconium compound such as an alkoxide, a halide or haloalkoxide with the ketoamide and then with the other compound(s) to form the A ligands if necessary. Where the A-ligands are alkoxide, these may form part of the starting zirconium compound. When mixed alkoxide ligands are required this may be achieved by reacting the alcohol forming a more stable alkoxide with the alkoxide of the first alcohol so that some of the first alcohol is displaced from the original compound to form the mixed alkoxide. The reaction of n moles of the ketoamide or of a compound forming the A ligand with a zirconium alkoxide or haloalkoxide produces n moles of alcohol or of a hydrogen halide derived from the zirconium alkoxide or haloalkoxide. When an alcohol is produced in such a reaction it may be removed from the product, usually by distillation or it may remain in the product as a free alcohol if desired.

Zirconium haloalkoxides may be represented by the formula $Zr(OR)_x.B_{(4-x)}$ where R is an alkyl group as described above, B represents a halide and x is a number from 0 to less than 4. The haloalkoxides may be of mixed formulation and therefore x need not be an integer. The preferred halides are chloride and bromide, particularly chloride.

Preferably the zirconium alkoxide or haloalkoxide is a zirconium alkoxide of formula $Zr(OR)_4$, where R has the meaning described above. Each R may or may not be the same as each other R. In one embodiment, the zirconium alkoxide is a tetra-alkyl alkoxide where all alkoxide groups are the same. Preferred zirconium alkoxides include tetra-i-propoxy zirconium, tetra-ethyl zirconium, tetra-n-propoxy zirconium and tetra-n-butoxy zirconium since these are readily available commercial materials. In an alternative embodiment the zirconium alkoxide is a mixed alkoxide. This embodiment is particularly useful where one or more of the OR groups is derived from an alkoxide which is less readily available. In such a case, a tetra alkoxy zirconium compound $Zr(OR)_4$ may be reacted with an alcohol R'OH to form a mixed alkoxide $Zr(OR)_y(OR')_z$, where y and z may vary from 1 to 3 and y+z=4. When reacted with less than 4 moles of the ketoamide, the more easily displaced alcohol of ROH and R'OH will be replaced first to give products of the form $Zr(L)_x(OR')_{(4-x)}$ if ROH is more readily displaced than R'OH. Suitable zirconium alkoxides may therefore comprise $Zr(isopropoxide)_2$ $(2-ethylhexoxide)_2$, $Zr(n-butoxide)_2(2-ethylhexoxide)_2$, $Zr(n-butoxide)_2(tert-amylalkoxide)_2$, $Zr(isopropoxide)_2$ $(tert-amylalkoxide)_2$.

The catalyst composition may additionally comprise a solvent or diluent. The solvent or diluent may be a compound that coordinates with the zirconium catalyst or it may be non-coordinating. The solvent may comprise an alcohol (which may be alcohol liberated in the reaction of a zirconium alkoxide with the ketoamide). Suitable solvents include polyols (e.g. a similar polyol to that used in a polyurethane reaction for which the compound is used as catalyst), such as 1,4-butane diol, 1,3-propylene glycol, ethylene glycol, diethylene glycol, a polyethylene glycol, a polypropylene glycol, a polyester polyol, a ketoamide, particularly the ketoamide used to form the catalyst, ethylacetoacetate, acetylacetone, diethylmalonate or an excess of a compound used to form one of the A ligands.

Examples of preferred catalysts comprise compounds of the following formulae:—$Zr(DEAA)_2(2-ethylhexoxide)_2$, $Zr(n-butoxide)_2(DEAA)_2$, $Zr(n-propoxide)_2(DEAA)_2$, $Zr(DEAA)_2(tert-amylalkoxide)_2$, $Zr(isopropoxide)_2$ $(DEM)_2$, $Zr(DEAA)_4$, $Zr(t-butoxide)_2(DEM)_2$, $Zr(DEAA)_4$, $Zr(DEAA)_2(propanedioxide)_2$, $Zr(DEAA)_2(diethyleneglycoxide)_2$, $Zr(DEAA)_2(ethylacetoacetato)_2$, $Zr(DEAA)_2(2,4-pentanedionato)_2$, $Zr(DEAA)_2(diethylmalonate)_2 Zr(DEAA)_2(1,3-propanediol) Zr(DEAA)_2(1,4-butanediol)$ and $Zr(DEAA)_2(diethyleneglycol)$. These catalysts may also include additional quantities of at least one of the ligand-forming compounds which are assumed to be present in a non-complexed state. In particular free DEAA, ethylacetoacetate, acetylacetone or polyol, especially diethylene glycol has been found to be of benefit.

In a preferred embodiment, the catalyst does not comprise a compound of bismuth as a co-catalyst.

The catalyst composition is useful in the manufacture of polyurethanes, i.e. as a cure catalyst for the reaction of a polyisocyanate with a compound containing an active hydrogen, especially a hydroxyl group, in particular a a polyol; or an amino compound. Applications of such polyurethanes are very diverse and include mouldings, foams, adhesives, coatings, cast or spray elastomers, casting resins etc. The catalyst composition may also be used to catalyse the reaction of a polyisocyanate binder with hydrous materials such as those derived from wood or plant fibres, e.g. as used in the manufacture of composite boards for the construction industry.

Any organic polyisocyanate compound or mixture of organic polyisocyanate compounds may be suitable provided said compounds have at least 2 isocyanate groups. Organic polyisocyanates include diisocyanates, particularly aromatic diisocyanates, and isocyanates of higher functionality. Examples of organic polyisocyanates include aliphatic isocyanates such as hexamethylene diisocyanate; and aromatic isocyanates such as m- and p-phenylene diisocyanate, tolylene-2,4- and tolylene- 2,6-diisocyanate, diphenyl-methane-4,4'-diisocyanate, chlorophenylene- 2,4-diisocyanate, naphthylene-1,5-diisocyanate, diphenylene-4,4'-diisocyanate, 4,4'-diisocyanate-3,3'-dimethyl-diphenyl, 3-methyldiphenylmethane-4,4'-di-isocyanate and diphenyl ether diisocyanate; and cycloaliphatic diisocyanates such as cyclohexane-2,4- and -2,3-diisocyanate, 1-methylcyclohexyl-2,4- and -2,6-diisocyanate and mixtures thereof and bis-(isocyanatocyclohexyl)methane and triisocyanates such as 2,4,6-triisocyanatotoluene and 2,4,4-tri- isocyanatodiphenylether. Modified polyisocyanates containing isocyanurate, carbodiimide or uretonimine groups may be used and are generally chosen when particular physical properties are desired. Blocked polyisocyanates, like the reaction product of a phenol or an oxime and a polyisocyanate, may be used, where they have a deblocking temperature below the temperature applied in use. The organic polyisocyanate may also be an isocyanate-ended prepolymer made by reacting an excess of a diisocyanate or higher functionality polyisocyanate with a polyol such as, for example a polyether polyol or a polyester polyol. Water-emulsifiable organic polyisocyanates like those described in UK patent no. 1 444 933, in European patent publication no. 516 361 and in PCT patent publication no. 93/03082 can also be used.

Mixtures of isocyanates may be used, for example a mixture of tolylene diisocyanate isomers such as the commercially available mixtures of 2,4- and 2,6-isomers and also the mixture of di- and higher polyisocyanates. Mixtures of diisocyanates known commercially as "crude MDI", contain about 60% of 4,4'-diphenylmethane diisocyanate along with other isomeric and analogous higher polyisocyanates. Polyisocyanate mixtures may optionally contain monofunctional isocyanates such as p-ethyl phenylisocyanate. Such mixtures are well-known in the art and include the crude phosgenation products containing methylene bridged polyphenyl polyisocyanates, including diisocyanate, triisocyanate and higher polyisocyanates together with any phosgenation by-products.

Preferred isocyanates are those wherein the isocyanate is an aromatic diisocyanate or polyisocyanate of higher functionality such as a pure diphenylmethane diisocyanate or a mixture of methylene bridged polyphenyl polyisocyanates containing diisocyanates, triisocyanates and higher functionality polyisocyanates. Methylene bridged polyphenyl polyisocyanates are well known in the art. They are prepared by phosgenation of corresponding mixtures of polyamines. For convenience, polymeric mixtures of methylene bridged polyphenyl polyisocyanates containing diisocyanate, triisocyanate and higher functionality polyisocyanates are referred to hereinafter as polymeric MDI. Polyisocyanates suitable for use with the organometallic complexes of the invention include SUPRASEC™ DNR, SUPRASEC™ 2185, RUBINATE™ M and RUBINATE™ 1840, all available from Huntsman Polyurethanes.

Preferably the polyisocyanate is liquid at room temperature. Suitable polyisocyanates are well known in the art.

The polyol component may be any suitable for the manufacture of polyurethanes and includes polyester-polyols, polyester-amide polyols, polyether-polyols, polythioether-polyols, polycarbonate polyols, polyacetal polyols, polyolefin polyols polysiloxane polyols, dispersions or solutions of addition or condensation polymers in polyols of the types described above, often referred to as "polymer" polyols. A very wide variety of polyols has been described in the prior art and is well known to the formulator of polyurethane materials.

Typically, a mixture of polyols is used to manufacture polyurethane having particular physical properties. The polyol or polyols is selected to have a molecular weight, backbone type and hydroxy functionality which is tailored to the requirements of the formulator. Typically the polyol includes a chain extender, which is often a relatively short-chain diol such as 1,4-butane diol or diethylene glycol or a low molecular weight polyethylene glycol. Alternative chain extenders in commercial use, such as diamines, e.g. MOCA (4,4-methylene bis(2-chloroaniline)) may also be used.

Suitable polyols include the polyalkylene ether- and polyester-polyols. The polyalkylene ether polyols include the poly(alkylene oxide) polymers such as poly(ethylene oxide) and poly(propylene oxide) polymers and copolymers with terminal hydroxyl groups derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane and like low molecular weight polyols. High molecular weight polyether polyol may be used. Also, mixtures of high molecular weight polyether polyols such as mixtures of di- and tri-functional materials optionally with lower molecular weight or different chemical composition materials may be used. Useful polyester polyols include polylactones, e.g. polycaprolactone, and those produced by reacting a dicarboxylic acid (which may be an aliphatic or aromatic dicarboxylic acid or anhydride) with an excess of a diol, for example, adipic acid with ethylene glycol or butanediol, terephthalic acid or anhydride with ethylene glycol or butane diol, or by reacting a lactone with an excess of a diol such as reacting caprolactone with propylene glycol.

Compounds additional to the polyisocyanate, polyol, and catalyst(s) may be present in the polyurethane reaction mixture. Such compounds include release agents, fillers, colourants, cross-linkers, chain extenders, blowing agents, fungicides, waxes, impact modifiers, surfactants, plasticisers, water, coupling agents and fire retardants. This list is not exhaustive.

The invention will be further described in the following examples.

EXAMPLE 1

Tetra-n-propoxy zirconium in n-propanol solution (140 g, 0.316 moles) was placed in a rotary evaporator and 2-ethyl-1-hexanol (2-EHA) (82 g, 0.63 moles) was added, followed by N,N-diethylacetoacetamide (DEAA) (99.4 g, 0.63 moles). The mixture was stirred for 15-20 minutes at 70° C., then distilled under vacuum to remove all free n-propanol (111 g). NMR analysis indicated a 100% product of $Zr(O—CH_2CH_2(C_2H_5)C_4H_9)_2 (OC(CH_3)CHCON(C_2H_5)_2)_2$.

EXAMPLE 2

N,N-diethylacetoacetamide (4 moles, 629 g) was slowly added to a solution of zirconium(IV) propoxide (1 mole, 323 g) in 1-propanol (2 moles, 120 g) at ambient temperature. The mixture was then stirred for an additional 15 minutes at 45° C. before excess 1-propanol (5 moles, 300 g) is distilled off under reduced pressure at a temperature of 60 to 70° C. The resulting product contains $Zr(OC(CH_3)CHCON(C_2H_5)_2)_4$ (1 mole) and approx 1 mole of 1-propanol. The propanol may be completely removed by recrystallising solid $Zr(DEM)_4$ from toluene solution using heptane.

EXAMPLE 3

N,N-diethylacetoacetamide (60 moles, 9.4 kg) was slowly added to a solution of zirconium(IV) propoxide (10 moles, 3.2 kg) in 1-propanol (20 moles, 1.2 kg) at ambient temperature. The mixture was then stirred for an additional 15 minutes at 45° C. and all 1-propanol (48.6 moles, 2.9 kg) is distilled off under reduced pressure at a temperature of 60 to 70° C. The resulting product contains Zr(OC(CH$_3$)CHCON(C$_2$H$_5$)$_2$)$_4$+free N,N-diethylacetoacetamide at a ratio of 1 mole: 2 moles.

EXAMPLE 4

Tetra-n-propoxy zirconium in n-propanol solution (90.8 g, 0.205 moles) was placed in a rotary evaporator and tert-butanol (30.3 g, 0.41 moles) was added, followed by DEAA (64.5 g, 0.41 moles). The mixture was stirred for 15-20 minutes at 70° C., then distilled under vacuum to remove all free n-propanol (73 g). The resulting product contains Zr(O—C(CH$_3$)$_3$)$_2$(OC(CH$_3$)CHCON(C$_2$H$_5$)$_2$)$_2$.

EXAMPLE 5

The catalysts of Examples 1 and 4 were used in a polyurethane casting formulation. 70 g of polyol (commercial mixture of a primary and secondary polyol) was placed in a speed mixer cup, mixed with the catalyst (based on polyol 3% or 5%), then mixed with 72.16 g of polyisocyanate prepolymer (Desmodur™ W, aliphatic isocyanate (methylene bis(4-cyclohexyl isocyanate)) for 10 seconds. A portion of the mixture was then poured onto a surface at room temperature; the rest (approx 135 g) was left in the beaker also at room temperature (about 20-25° C.). The gel time (time to no string) and tack free time was measured. The results are shown in Table 1.

TABLE 1

| Catalyst | Amount of catalyst (% wt based on polyol) | Gel time (minutes) On surface | Tack-free time (minutes) On surface | Gel time (minutes) In beaker | Tack-free time (minutes) In beaker |
| --- | --- | --- | --- | --- | --- |
| Example 1 | 3 | 30 | 330 | 11 | 35 |
| Example 1 | 5 | 13 | 120 | 8 | 25 |
| Example 4 | 3 | 45 | >240 | 10 | N/A |
| Example 4 | 5 | 15 | 105 | 8 | 15 |

The faster gel time and tack-free time in the beaker is due to the retention of heat from the exothermic reaction between the isocyanate and the polyol. When the mixture is cured as a coating on a surface the heat can dissipate more easily because the coating is relatively thin compared with the mass in the beaker.

EXAMPLE 6

The catalyst made in Example 2 was used in the preparation of a rigid foam using a commercial polyol/polyisocyanate system. The polyol (45 g) was placed in a mixer cup with a blowing catalyst (bis(dimethylaminoethyl)ether (DMEA)) (0.27 g) and the catalyst of the invention, mixed for 10 seconds and then an isocyanate (45 g) was added. The mixture was placed in a beaker and the cream-time, string-time, time till the foam finished rising and tack-free time was observed. The results are shown in Table 2, together with a comparison in which the catalyst of the invention was replaced by a commercial gelling catalyst (DABCO™33LV).

TABLE 2

| Catalyst | Amount of catalyst (% wt based on polyol) | Cream time (s) | String time (s) | Rise time (s) | Tack-free time (s) |
| --- | --- | --- | --- | --- | --- |
| Example 2 | 0.6 | 20 | 70 | 60 | 70 |
| Example 2 | 0.8 | 30 | 60 | 60 | 60 |
| comparison | 0.6 | 55 | 180 | 165 | 220 |
| comparison | 0.9 | 50 | 140 | 130 | 160 |

EXAMPLE 7

A commercial polyol (6000 MW) was mixed with the catalyst of Example 1 and then with a plasticiser/polyisocyanate mixture. The mixture was mixed a high speed for 10 seconds and left to cure at room temperature. A comparison using a commercial mercury-based gelling catalyst (Thorcat™ 535) was also run. The results are shown in Table 3.

TABLE 3

| Catalyst | Amount of catalyst (% wt based on polyol) | gel time (s) |
| --- | --- | --- |
| Example 1 | 0.5 | 35 |
| Example 1 | 0.4 | 55 |
| Example 1 | 0.2 | 150 |
| comparison | 0.5 | 720 |
| comparison | 0.4 | 900 |
| comparison | 0.2 | 1200 |

EXAMPLE 8

VERTEC™ NPZ (tetra-n-propoxy zirconium in n-propanol) (443 g, 1 mole of metal) was placed into a reaction flask purged with nitrogen, fitted with a stirrer, thermometer, and condenser and mounted in a water bath. N,N-diethylacetoacetamide (314.42 g, 2 mole) was added to the reactor via a dropping funnel whilst stirring and an exothermic reaction could be observed. N-Propanol (NPA) (225.65 g, 3.76 mole) was removed form the product, Zr(DEM)$_2$(NPA)$_2$, under reduced pressure (70° C./30"Hg).

EXAMPLE 9

VERTEC™ NPZ (443 g, 1 mole) was placed into a reaction flask purged with nitrogen, fitted with a stirrer, thermometer, and condenser and mounted in a water bath. N,N-diethylacetoacetamide (628.84 g, 4 mole) was added to the reactor via a dropping funnel whilst stirring and an exothermic reaction could be observed. Diethylene glycol (DEG) (106.12 g, 1 mole) was added to the reactor via a dropping funnel whilst stirring and no exothermic reaction was observed. N-Propanol (354 g, 5.9 mole) was removed form the product, Zr(DEAA)$_4$+DEG, under reduced pressure (70° C./30"Hg).

EXAMPLE 10

VERTEC™ NPZ (100.00 g, 0.2272 mol) was placed into a reaction flask, fitted with a condenser and mounted in a temperature controlled water bath. While spinning the flask, N,N-diethylacetoacetamide (71.46 g, 0.4544 mol) was added to the reactor via a dropping funnel, this was left to blend for 10 mins at which point a slight exotherm was noticed. Then 1,3-propanediol (17.30 g, 0.2272 mol) was added drop-wise to the reactor and blended for a further 10 mins. N-propanol (68.29 g, 1.14 mol) was removed from the product, Zr(DEAA)$_2$(1,3-propanediol), under reduced pressure (87° C./29" Hg).

EXAMPLE 11 SHELF LIFE TESTS 0.1% catalyst was added to a commercial polyester polyol, mixed and allowed to age at 40° C. for 0, 4 and 7 days before reacting the polyol containing the catalyst with a commercial modified MDI polyisocyanate. The formulation was then poured into a preheated aluminium dish and allowed to cure at 80° C. during which time the hardness was measured at intervals up to one hour. The results are shown in Table 4.

TABLE 4

| Catalyst | Polyol + catalyst ageing time (days) | Shore A Hardness of polyurethane elastomer samples cured at 80° C. | | |
|---|---|---|---|---|
| | | 20 mins | 40 mins | 60 mins |
| Example 1 | 0 | 66 | 73 | 75 |
| Example 1 | 4 | 62 | 72 | 74 |
| Example 1 | 7 | 61 | 67 | 70 |
| Example 8 | 0 | 73 | 77 | 77 |
| Example 8 | 4 | 70 | 71 | 75 |
| Example 8 | 7 | 68 | 70 | 79 |
| Comparison Zr(EAA)$_4$ | 0 | 14 | 32 | 49 |
| Comparison Zr(EAA)$_4$ | 4 | 0 | 0 | 7 |
| Comparison Zr(EAA)$_4$ | 7 | 0 | 0 | 0 |

The results show that the catalysts of the invention remain active for curing the polyurethane reaction after mixing with polyol for at least several days. A prior art catalyst described in U.S. Pat. No. 5,965,686, Zr(EAA)$_4$, was made by reacting 4 moles of ethylacetoacetate with VERTEC NPZ and removing the resulting n-propanol from the reaction mixture. This catalyst is active when it is first mixed with the polyol but appears to lose activity when allowed to age in contact with the polyol. The improved shelf-life of the catalysts of the invention allows the polyurethane manufacturer greater process flexibility.

The invention claimed is:

1. A catalyst compound of formula Zr(L)(A$^1$)(A$^2$)(A$^3$) or of formula Zr(L)(A)(polyol) for the production of polyurethane, wherein L represents a ketoamide ligand, A, A$^1$, A$^2$ and A$^3$ may be the same or different and each represents a ligand derived from a compound selected from the group consisting of an alcohol, a polyol, an alkyl acetoacetate, a diketone, a ketoamide, a carboxylic acid or ester thereof, an alkanolamine, a phosphoric acid ester and a sulphonic acid or ester thereof; provided that at least one of A, A$^1$, A$^2$ and A$^3$ represents a ligand derived from a ketoamide and further provided that either:
   (i) none of A$^1$, A$^2$ and A$^3$ represents a ligand —OR where R is alkyl or a hydroxy-alkyl, hydroxyalkoxyalkyl, or (hydroxy)polyoxyalkyl group, or
   (ii) at least two of A$^1$, A$^2$ and A$^3$ represent a ligand —OR where R is alkyl or a hydroxy-alkyl, hydroxyalkoxyalkyl, or (hydroxy)polyoxyalkyl group,
   and wherein the catalyst does not consist of Zr(DEAA)$_2$ (isopropoxide)$_2$ where DEAA represents a ligand derived from N,N-diethylacetoacetamide,
wherein the catalyst does not comprise a compound of bismuth as a co-catalyst, and
wherein the polyurethane has a Shore A hardness greater than 60 after 20 minutes of curing.

2. The catalyst compound according to claim 1, wherein L represents a ketoamide ligand of general structure shown in Formula 1"

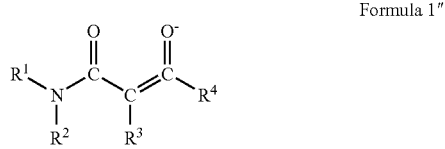

Formula 1"

in which R$^1$, R$^2$ and R$^4$ are independently selected from H, linear or branched alkyl groups, and aryl groups, wherein said aryl groups may be unsubstituted or substituted with alkyl, halogen or ether groups, and R$^3$ is H or linear or branched alkyl.

3. The catalyst compound according to claim 2, wherein R$^1$, R$^2$ and/or R$^4$ are alkyl groups containing from 1 to 8 carbon atoms, and R$^3$ is H.

4. The catalyst compound according to claim 3, wherein said ketoamide comprises N,N-diethylacetoacetamide.

5. The catalyst compound according to claim 1, wherein at least one of A$^1$, A$^2$ and A$^3$ is derived from an alcohol of general formula R—OH where R is an alkyl group containing from 1 to 12 C atoms or an aryl, substituted aryl or polyaryl group.

6. The catalyst compound according to claim 1, having the general formula Zr(ketoamide)$_2$(OR)$_2$ where each R is the same or different and is an alkyl group containing from 1 to 12 C atoms or an aryl, substituted aryl or polyaryl group.

7. The catalyst compound according to claim 1, wherein at least one of A$^1$, A$^2$ and A$^3$ is derived from an alcohol having more than one hydroxy group.

8. The catalyst compound according to claim 7, wherein the alcohol comprises ethylene glycol, 1,3-propylene glycol, 1,4-butane diol, diethylene glycol, dipropylene glycol, polyethylene glycol, polypropylene glycol, a polyester polyol, a polyether polyol or a hydroxy- functionalised resin.

9. The catalyst compound according to claim 7, wherein the alcohol bonds to the zirconium as a multidentate ligand such that A$^1$, A$^2$ and/or A$^3$ are linked together.

10. The catalyst compound according to claim 7, wherein the catalyst is of general formula Zr(ketoamide)$_2$(polyol) including compounds in which bridged dimeric and oligomeric forms are present.

11. The catalyst compound according to claim 1 comprising a compound selected from the group consisting of Zr(DEAA)$_2$(2-ethylhexoxide)$_2$, Zr(n-butoxide)$_2$(DEAA)$_2$, Zr(n-propoxide)$_2$(DEAA)$_2$, Zr(DEAA)$_2$(tert-amylalkoxide)$_2$, Zr(DEAA)$_4$, Zr(t-butoxide)$_2$(DEAA)$_2$, Zr(DEAA)$_2$(propanedioxide)$_2$, Zr(DEAA)$_2$(diethyleneglycoxide)$_2$, Zr(DEAA)$_2$(ethylacetoacetato)$_2$, Zr(DEAA)$_2$(2,4-pentanedionato)$_2$, Zr(DEAA)$_2$(diethylmalonate)$_2$, Zr(DEAA)$_2$(1,3-propanediol), Zr(DEAA)$_2$(1,4-butanediol) and Zr(DEAA)$_2$(diethyleneglycol); where DEAA represents a ligand derived from N,N-diethylacetoacetamide.

12. The catalyst compound according to claim 1 further comprising a solvent.

13. The catalyst compound according to claim 12, wherein said solvent is selected from the group consisting of an alcohol, a polyol, a ketoamide, ethylacetoacetate, acetylacetone, diethylmalonate and an excess of a compound used to form one of the A ligands.

14. The catalyst compound according to claim 12, comprising from 1 to 10 moles of solvent per mole of zirconium.

15. A polyurethane composition comprising at least one of
(i) a polyisocyanate and
(ii) a polyol
and a catalyst compound of formula $Zr(L)(A^1)(A^2)(A^3)$ or of formula $Zr(L)(A)(polyol)$, wherein L represents a ketoamide ligand, A, $A^1$, $A^2$ and $A^3$ may be the same or different and each represents a ligand derived from a compound selected from the group consisting of an alcohol, a polyol, an alkyl acetoacetate, a diketone, a ketoamide, a carboxylic acid or ester thereof, an alkanolamine, a phosphoric acid ester and a sulphonic acid or ester thereof; provided that at least one of A, $A^1$, $A^2$ and $A^3$ represents a ligand derived from a ketoamide and further provided that either:
(i) none of $A^1$, $A^2$ and $A^3$ represents a ligand —OR where R is alkyl or a hydroxy-alkyl, hydroxyalkoxyalkyl, or (hydroxy)polyoxyalkyl group, or
(ii) at least two of $A^1$, $A^2$ and $A^3$ represent a ligand —OR where R is alkyl or a hydroxy-alkyl, hydroxyalkoxyalkyl, or (hydroxy)polyoxyalkyl group,
wherein the catalyst does not comprise a compound of bismuth as a co-catalyst, and
wherein the polyurethane has a Shore A hardness greater than 60 after 20 minutes of curing.

16. A composition according to claim 15 wherein said catalyst comprises a compound selected from the group consisting of $Zr(DEAA)_2(2\text{-ethylhexoxide})_2$, $Zr(isopropoxide)_2(DEAA)_2$, $Zr(n\text{-butoxide})_2(DEAA)_2$, $Zr(n\text{-propoxide})_2(DEAA)_2$, $Zr(DEAA)_2(tert\text{-amylalkoxide})_2$, $Zr(DEAA)_4$, $Zr(t\text{-butoxide})_2(DEAA)_2$, $Zr(DEAA)_2(propanedioxide)_2$, $Zr(DEAA)_2(diethyleneglycoxide)_2$, $Zr(DEAA)_2(ethylacetoacetato)_2$, $Zr(DEAA)_2(2,4\text{-pentanedionato})_2$, $Zr(DEAA)_2(diethylmalonate)_2$, $Zr(DEAA)_2(1,3\text{-propanediol})$, $Zr(DEAA)_2(1,4\text{-butanediol})$ and $Zr(DEAA)_2(diethyleneglycol)$; where DEAA represents a ligand derived from N,N-diethylacetoacetamide.

17. A composition according to claim 15 further comprising one or more compounds selected from the group consisting of a release agent, a filler, a colourant, a cross-linker, a chain extender, a blowing agent, a fungicide, a wax, an impact modifier, a surfactant, a plasticiser, water, a coupling agent, and a fire retardant.

18. A process for the manufacture of a polyurethane comprising reacting a polyisocyanate compound with a compound containing an active hydrogen in the presence of a catalyst compound of formula $Zr(L)(A^1)(A^2)(A^3)$ or of formula $Zr(L)(A)(polyol)$, wherein L represents a ketoamide ligand, A, $A^1$, $A^2$ and $A^3$ may be the same or different and each represents a ligand derived from a compound selected from the group consisting of an alcohol, a polyol, an alkyl acetoacetate, a diketone, a ketoamide, a carboxylic acid or ester thereof, an alkanolamine, a phosphoric acid ester and a sulphonic acid or ester thereof; provided that at least one of A, $A^1$, $A^2$ and $A^3$ represents a ligand derived from a ketoamide and further provided that either:
(i) none of $A^1$, $A^2$ and $A^3$ represents a ligand —OR where R is alkyl or a hydroxy-alkyl, hydroxyalkoxyalkyl, or (hydroxy)polyoxyalkyl group, or
(ii) at least two of $A^1$, $A^2$ and $A^3$ represent a ligand —OR where R is alkyl or a hydroxy-alkyl, hydroxyalkoxyalkyl, or (hydroxy)polyoxyalkyl group,
wherein the catalyst does not comprise a compound of bismuth as a co-catalyst, and
wherein the polyurethane has a Shore A hardness greater than 60 after 20 minutes of curing.

19. A process according to claim 18, wherein said compound containing an active hydrogen comprises a hydroxyl-containing compound.

20. A process according to claim 19, wherein said hydroxyl-containing compound comprises a polyol.

21. A process according to claim 19, wherein said hydroxyl-containing compound comprises a lignocellulosic material.

22. A process according to claim 18, wherein said catalyst is selected from the group consisting of $Zr(DEAA)_2(2\text{-ethylhexoxide})_2$, $Zr(isopropoxide)_2(DEAA)_2$, $Zr(n\text{-butoxide})_2(DEAA)_2$, $Zr(n\text{-propoxide})_2(DEAA)_2$, $Zr(DEAA)_2(tert\text{-amylalkoxide})_2$, $Zr(DEAA)_4$, $Zr(t\text{-butoxide})_2(DEAA)_2$, $Zr(DEAA)_2(propanedioxide)_2$, $Zr(DEAA)_2(diethyleneglycoxide)_2$, $Zr(DEAA)_2(ethylacetoacetato)_2$, $Zr(DEAA)_2(2,4\text{-pentanedionato})_2$, $Zr(DEAA)_2(diethylmalonate)_2$, $Zr(DEAA)_2(1,3\text{-propanediol})$, $Zr(DEAA)_2(1,4\text{-butanediol})$ and $Zr(DEAA)_2(diethyleneglycol)$; where DEAA represents a ligand derived from N,N-diethylacetoacetamide.

23. A process according to claim 18, wherein L represents a ketoamide ligand of general structure shown in Formula 1″

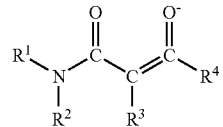

Formula 1″ in which $R^1$, $R^2$ and $R^4$ are independently selected from H, linear or branched alkyl groups, and aryl groups, wherein said aryl groups may be unsubstituted or substituted with alkyl, halogen or ether groups, and $R^3$ is H or linear or branched alkyl.

24. A process according to claim 23, wherein $R^1$, $R^2$ and/or $R^4$ are alkyl groups containing from 1 to 8 carbon atoms, and $R^3$ is H.

25. A process according to claim 24, wherein said ketoamide comprises N,N-diethylacetoacetamide.

26. A process according to claim 18, wherein at least one of $A^1$, $A^2$ and $A^3$ is derived from an alcohol of general formula R—OH where R is an alkyl group containing from 1 to 12 C atoms or an aryl, substituted aryl or polyaryl group.

27. A process according to claim 18, having the general formula $Zr(ketoamide)_2(OR)_2$ where each R is the same or different and is an alkyl group containing from 1 to 12 C atoms or an aryl, substituted aryl or polyaryl group.

28. A process according to claim 18, wherein at least one of $A^1$, $A^2$ and $A^3$ is derived from an alcohol having more than one hydroxy group.

29. A process according to claim 28, wherein the alcohol is selected from the group consisting of ethylene glycol, 1,3-propylene glycol, 1,4-butane diol, diethylene glycol, dipropylene glycol, polyethylene glycol, polypropylene glycol, a polyester polyol, a polyether polyol and a hydroxy-functionalised resin.

30. A process according to claim 28, wherein the alcohol bonds to the zirconium as a multidentate ligand such that $A^1$, $A^2$ and/or $A^3$ are linked together.

31. A process according to claim 28, wherein the catalyst is of general formula $Zr(ketoamide)_2(polyol)$ including compounds in which bridged dimeric and oligomeric forms are present.

32. A process according to claim 18, wherein said catalyst further comprises a solvent.

33. A process according to claim 32, wherein said solvent is selected from the group consisting of an alcohol, a polyol, a ketoamide, ethyl acetoacetate, acetylacetone, diethyl malonate and an excess of a compound used to form one of the A ligands.

34. A process according to claim 18, wherein $A^1$, $A^2$ and $A^3$ are all derived from a ketoamide.

* * * * *

UNITED STATES PATENT AND TRADEMARK OFFICE
CERTIFICATE OF CORRECTION

PATENT NO. : 8,586,696 B2  Page 1 of 1
APPLICATION NO. : 11/994704
DATED : November 19, 2013
INVENTOR(S) : Tulloch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1250 days.

Signed and Sealed this
Twenty-second Day of September, 2015

Michelle K. Lee
*Director of the United States Patent and Trademark Office*